US009352628B2

(12) United States Patent
Barton et al.

(10) Patent No.: US 9,352,628 B2
(45) Date of Patent: May 31, 2016

(54) LIFT SUSPENSION SYSTEM WITH OFFSET CONTROL ARMS (71) Applicant: Ridewell Corporation, Springfield, MO (US)

(72) Inventors: Bruce Barton, Battlefield, MO (US); Matthew Koontz, Ozark, MO (US)

(73) Assignee: RIDEWELL CORPORATION, Springfield, MO (US)

( * ) Notice: Subject to any disclaimer, the term of this patent is extended or adjusted under 35 U.S.C. 154(b) by 0 days.

(21) Appl. No.: 14/720,221

(22) Filed: May 22, 2015

(65) Prior Publication Data

US 2015/0336436 A1 Nov. 26, 2015

Related U.S. Application Data (60) Provisional application No. 62/002,038, filed on May 22, 2014.

(51) Int. Cl.
*B60G 9/02* (2006.01)
*B60G 11/27* (2006.01)
*B62D 61/12* (2006.01)
*B60G 9/00* (2006.01)
*F16F 1/44* (2006.01)

(52) U.S. Cl.
CPC *B60G 9/02* (2013.01); *B60G 9/003* (2013.01); *B60G 11/27* (2013.01); *B62D 61/12* (2013.01); *F16F 1/445* (2013.01); *B60G 2200/314* (2013.01); *B60G 2202/152* (2013.01); *B60G 2202/412* (2013.01); *B60G 2204/4702* (2013.01)

(58) Field of Classification Search
CPC .......... B60G 9/02; B60G 11/27; B60G 9/003; B60G 2202/152; B60G 2204/4702; B62D 61/12; F16F 1/445
See application file for complete search history.

(56) References Cited

U.S. PATENT DOCUMENTS

| | | | | | |
|---|---|---|---|---|---|
| 5,403,031 | A | * | 4/1995 | Gottschalk | B60G 9/02 280/124.157 |
| 6,131,930 | A | * | 10/2000 | Chalin | B60G 7/02 280/86.75 |
| 7,360,773 | B2 | * | 4/2008 | Gottschalk | B60G 9/003 188/290 |
| 7,434,821 | B2 | * | 10/2008 | Hinz | B60G 7/001 280/124.116 |
| 7,510,197 | B2 | * | 3/2009 | Gottschalk | B60B 35/06 280/86.5 |
| 7,878,516 | B2 | * | 2/2011 | Gottschalk | B60B 35/08 280/124.11 |
| 8,641,062 | B2 | * | 2/2014 | Gottschalk | B60G 9/02 180/24.02 |
| 2005/0151337 | A1 | * | 7/2005 | Chalin | B60G 3/20 280/86.5 |

* cited by examiner

*Primary Examiner* — Faye M Fleming
(74) *Attorney, Agent, or Firm* — Lathrop & Gage LLP

(57) ABSTRACT

A suspension system with an axle lift system for use on vehicles is described, the axle lift system having control arms with an offset lift air bag configuration. The suspension system includes offset control arms and an off-axis lift air bag. The off-axis lift air bag is disposed away from and sometimes at an angle to the axis of the control arms.

15 Claims, 7 Drawing Sheets

LIFT SUSPENSION SYSTEM WITH OFFSET CONTROL ARMS

RELATED APPLICATION

This application claims the benefit of U.S. Patent Application No. 62/002,038 filed May 22, 2014, the disclosure of which is incorporated herein by reference.

BACKGROUND

1. Technical Field

This disclosure relates to vehicles suspension systems and, in particular, to suspension systems for vehicles having lift axles. More specifically, this disclosure relates to systems for lifting axles incorporated into such vehicle suspension systems.

2. Discussion of Related Art

Vehicle suspension systems include a wide variety of configurations and structures. It is common in the vehicle industry to provide suspension configurations able to adjust the height of the suspension. In some suspensions, control arms are provided to hold an axle in place beneath a chassis. For some lift axle suspensions, a lift air bag is provided between the control arms to cause the axle to lift off the ground and toward the chassis upon inflation of the lift air bag. In such configurations the lift air bag is disposed substantially between the control arms.

SUMMARY OF THE INVENTION

In some embodiments, the axle lift system for a vehicle suspension comprises an upper air bag bracket attached to an upper control arm, a lower air bag bracket attached to an lower control arm, a lift air bag attached between the upper air bag bracket and the lower air bag bracket, wherein the lift air bag is disposed at an angle to the control arms.

In some embodiments, the control arms are disposed at an angle to the axle such that the first end of each control arm is offset from the second end with respect to the centerline of the chassis. In some of those embodiments, the control arms are disposed so that the control arms are attached to the axle so that the axle connection point is outboard relative to the point at which the control arm is attached to the chassis. In other embodiments, the control arms are disposed so that the control arms are attached to the axle so that the axle connection point is inboard relative to the point at which the control arm is attached to the chassis.

In some embodiments of the axle lift system the upper control arm comprises two portions which are disposed at an angle to each other along the longitudinal axis of the control arm; and the lower control arm comprises two portions which are disposed at an angle to each other. In some of those embodiments, the upper air bag bracket is attached to the second portion of the upper control arm and the lower air bag bracket is attached to the first portion of the lower control arm.

In some embodiments of the axle lift system, the upper air bag bracket is an air bag seat and at least one rib attaching the air bag seat to the upper control arm, and the lower air bag bracket is an air bag seat and at least one rib attaching the air bag seat to the lower control arm.

In some embodiments of the axle lift system, the lift air bag is disposed outboard of the control arms. In other embodiments of the axle lift system the lift air bag is disposed inboard of the control arms.

In some embodiments the suspension system utilizing the axle lift system comprises an axle; an upper control arm and a lower control arm pivotally attached to the axle, with the upper control arm substantially above the lower control arm; an upper air bag bracket attached to the upper control arm; a lower air bag bracket attached to the lower control arm; a lift air bag attached between the upper air bag bracket and the lower air bag bracket, wherein each of the control arms is disposed at a first angle to the axle such that the first end of each control arm is offset from the second end thereof with respect to the centerline of the chassis; wherein the lift air bag is disposed at a second angle to the control arms; and wherein the center axis of the lift air bag is substantially offset from the axis of the control arms. In some of these embodiments the center axis of the lift air bag is disposed outboard of the control arms to which it is attached. In other embodiments, the lift air bag is disposed inboard of the control arm to which it is attached.

A method for using the axle lift system is also described, comprising the steps of inflating the lift air bag until the upper and lower control arms pivot upwardly sufficiently to raise the axle a desired distance to a lifted position; operating the vehicle with the axle in the lifted position; deflating the lift air bag until the upper and lower control arms pivot downwardly sufficiently to lower the axle a desired distance to a lowered position; operating the vehicle with the axle in the lowered position. In some versions of the method the lifted position comprises a position wherein a tire mounted on the axle is not in contact with the ground, and the lower position comprises a position wherein a tire mounted on the axle is in contact with the ground. In some versions of the method the vehicle is provided with a suspension air bag for supporting the axle beneath the chassis, and comprises the steps of deflating the suspension air bag before or simultaneously with the step of inflating the lift air bag; and inflating the suspension air bag after or simultaneously with the step of deflating the lift air bag.

DETAILED DESCRIPTION

Referring now to the figures, various views of a vehicle suspension incorporating an embodiment of the axle lift system is depicted. The suspension system comprises a variety of components that may vary in detail between various suspensions systems and embodiments of the axle lift system and are not limited to those shown in the figures. An axle 100 is provided with hubs 104 rotationally attached at each end thereof. The axle 100 may have steerable hubs 104 as shown in the figures, or the hubs may be non-streerable hubs with fixed orientations with respect to the axle 100. Wheels with tires not shown in the figure are attached to the hubs for carrying the load applied to the axle 100 through the suspension system. The exact configuration of the axle 100 and wheels 104 are not limiting of the invention and can be modified as new axles 100 and wheels 104 are developed. The axle 100 is typically suspended beneath chassis 102 by various components such as hanger brackets 110. The vehicle suspension system is designed to allow the axle 100 to be lifted up when desired, thus removing the load from the tires on hubs 104.

At least two upper control arms 106 and at least two lower control arms 108 are provided for supporting the axle 100 beneath chassis 102. Each first end 200 of the at least two upper control arms 106 and of the at least two lower control arms 108 are pivotally attached to the axle. Each of the at least two upper control arms are separated from the other upper control arms along the length of the axle 100, and each of the at least two lower control arms are separated from the other lower control arms along the length of the axle 100. Each of the at least two upper control arms 106 are attached substantially above, on the side of or adjacent to the axle 100. Each of the lower control arms 108 are attached substantially below, on the side of or adjacent to the axle 100. In some embodiments, the first end of each upper control arm is attached to the axle at a point that is approximately opposed to a point on which the first end of a lower control arm is attached forming a pair of opposed control arms. In the depicted embodiment, the axle 100 is pivotally attached to the control arms 106 and 108 by brackets 500, and associated bolts and bushings; although in other embodiments a different method of attachment may be provided.

In the depicted embodiment, each of the control arms 106 and 108 are pivotally attached at a second end 202 thereof to hanger bracket 110. Typically two hanger brackets 110 are provided, one for each end of the axle 100, though in a different configuration there may be more hanger brackets 110 or the two brackets may be combined into a larger single bracket spanning the width of chassis 102. The hanger brackets 110 are provided for attaching the axle 100 to the chassis 102 and providing support to the suspension system. A cross member 112 may be provided connecting the two hanger brackets 110. In some embodiments, cross member 112 may support an air canister 114 for providing pressurized air to the various pneumatic systems of the suspension system.

A lift air bag 116 is connected to each upper and lower control arm pair. In the depicted embodiments lift air bag 116 is connected to the lower control arm 108 by lower lift bag bracket 204 and to upper control arm 106 by upper air bag bracket 206. Inflating air bag 116 will cause control arms 106 and 108 to raise axle 100 and disengage the tires from the ground. In some embodiments, at least two brackets 118 are also attached to chassis 102 to connect suspension air bags 120 to chassis 102. Suspension air bags 120 provide support to axle 100 to support it as it bears all or a part of the weight of chassis 102. When lift air bags 116 are inflated and expand then air pressure is released from air bags 120 allowing them to compress and allowing axle 100 to rise up toward chassis 102. When desired, the air pressure can be released from air bags 116 to lower axle 100 by control arms 106 and 108 while increasing the pressure in air bags 120 to take up a portion of the load on chassis 102.

Figure 3:
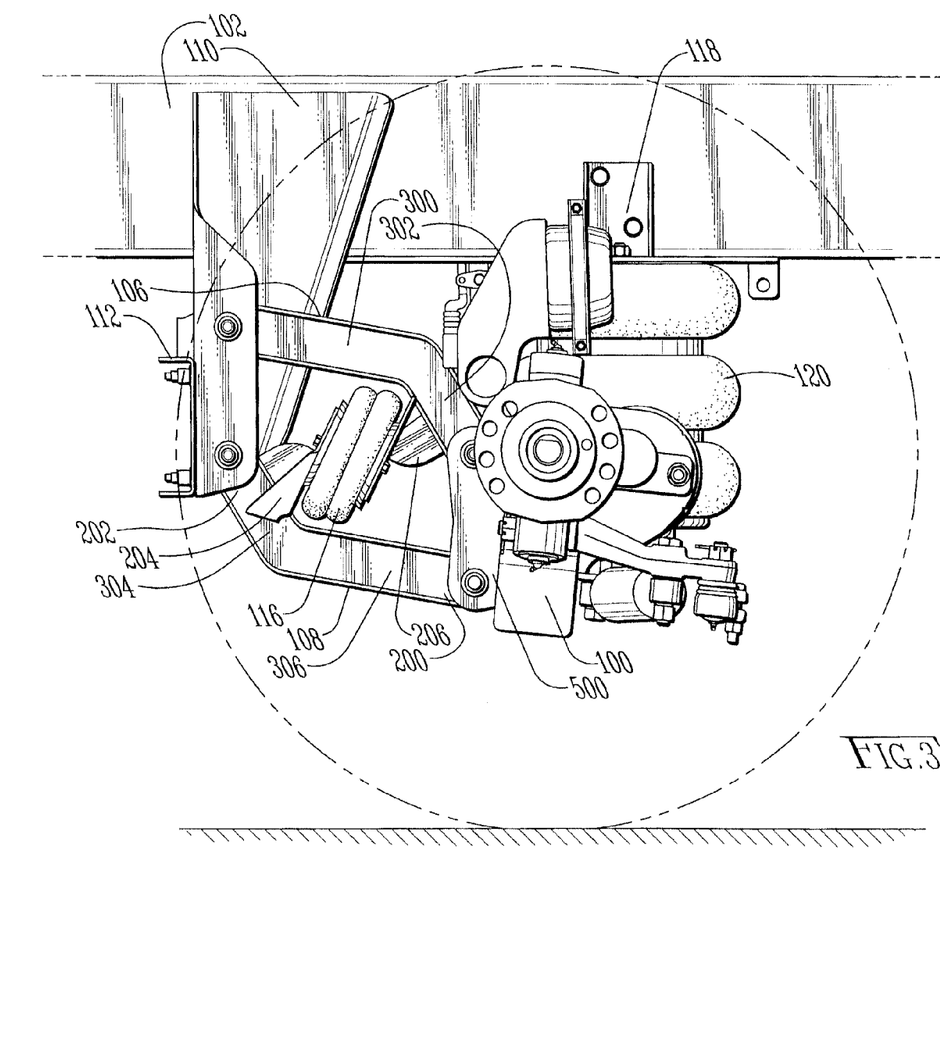
FIG. 3 is a detail side view of a vehicle suspension system incorporating an embodiment of the axle lift system in a lowered position.

Referring now more specifically to FIG. 3, a side view of a vehicle suspension system incorporating the axle lift system is depicted. The upper control arms 106 have a first portion 300 and a second portion 302 disposed at an angle to the first portion 300. Similarly, the depicted lower control arm 108 has a second portion 304 and a first portion 306 disposed at an angle to each other. In the depicted embodiment, bracket 204 is attached to second portion 306 of lower control arm 108 and bracket 206 is attached to second portion 302 of upper control arm 106. In some embodiments the angles may be more or less than that shown in the figures, or the control arms may be substantially straight with no angle between the various parts of the control arms. In some embodiments the same angle is used on both upper and lower control arms while in other embodiments different angles may be used on the upper and lower control arms. In the depicted embodiments, brackets 110 and 500 are substantially vertical in orientation; however in other embodiments the brackets may be oriented non-vertically or may have angles or bends in their orientation. The upper and lower control arms, the hanger brackets 110 and the axle bracket 500 define a polygonal arrangement which changes as the axle is lifted.

Figure 1:
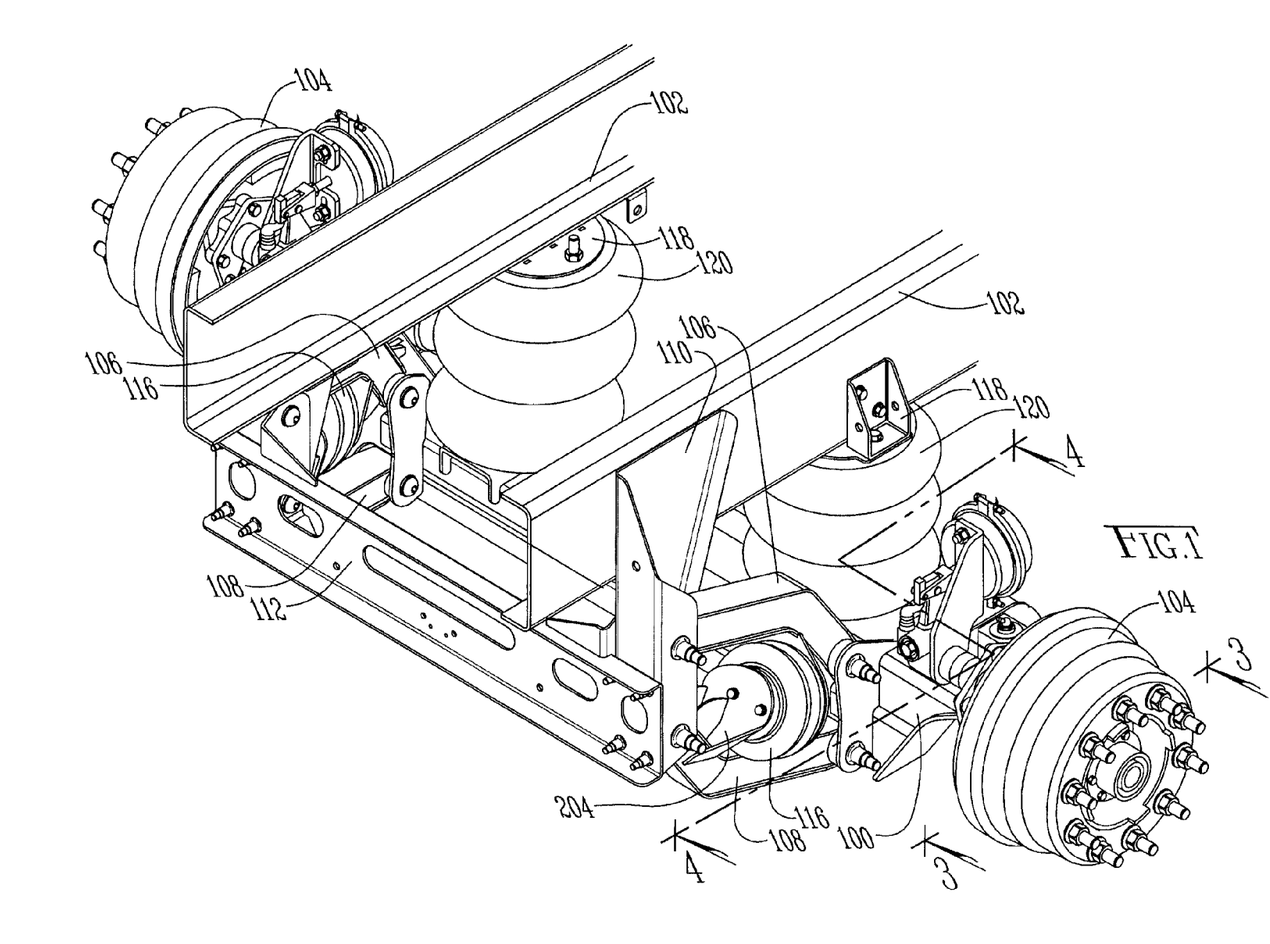
FIG. 1 is a perspective view of a vehicle suspension system incorporating an embodiment of the axle lift system.
Figure 2:
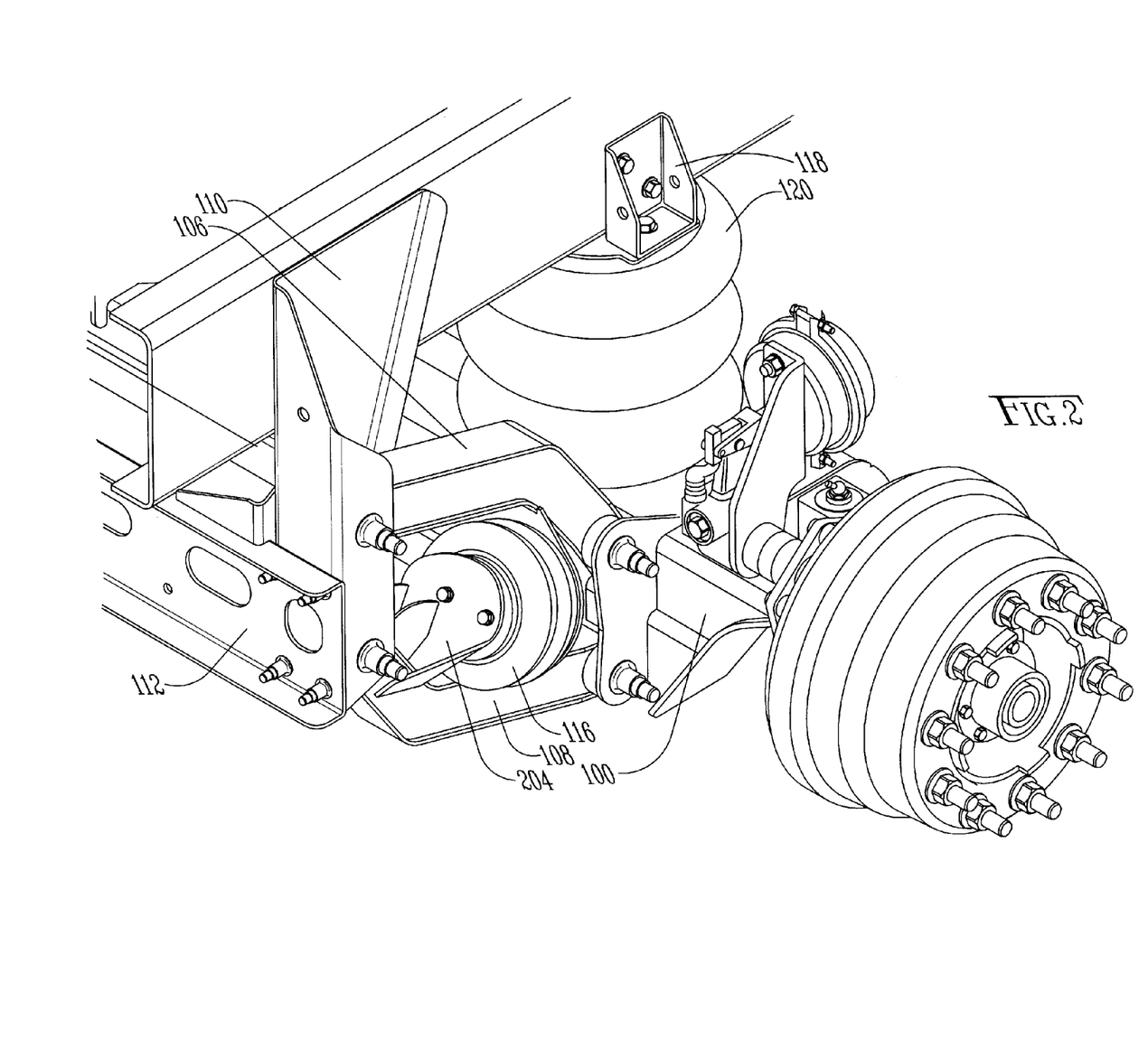
FIG. 2 is a detail perspective view of a vehicle suspension system incorporating an embodiment of the axle lift system.
Figure 4:
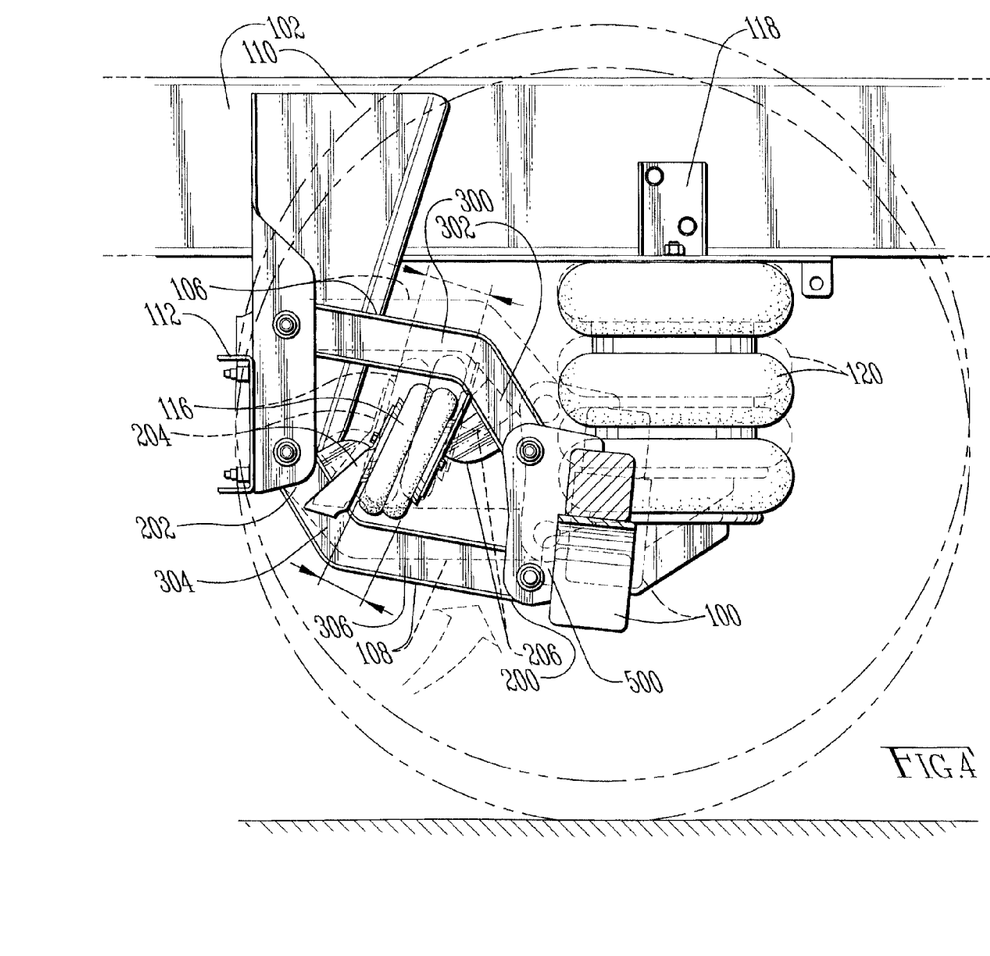
FIG. 4 is a cross-sectional side view of a vehicle suspension system incorporating an embodiment of the axle lift system.
Figure 5:
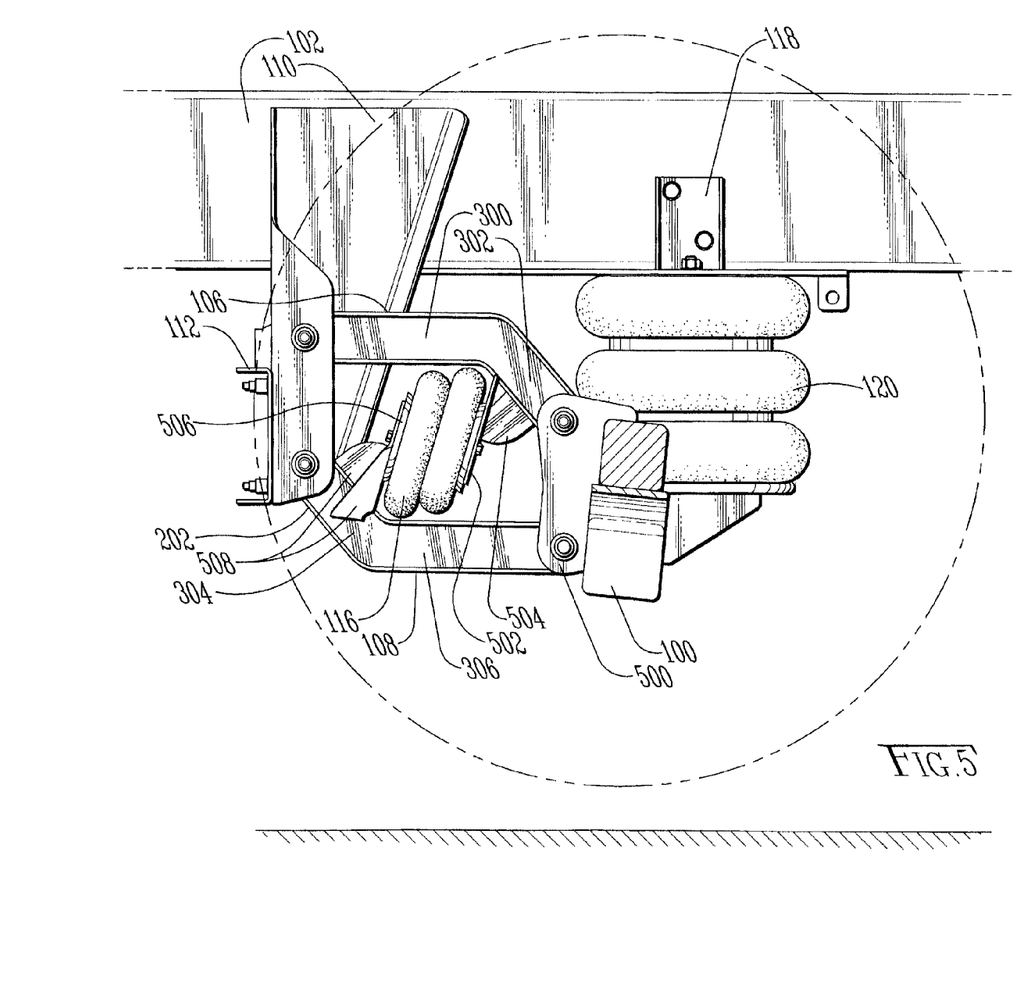
FIG. 5 is a cross-sectional side view of a vehicle suspension system incorporating an embodiment of the axle lift system in a raised position.

FIG. 3 depicts the suspension system in the lowered position with the tire shown in dashed lines in contact with the ground. FIGS. 4 and 5 are cross-sectional views of the suspension system along the axis labeled as 4-4 on FIG. 1. FIG. 4 depicts the suspension system transitioning from a lowered position shown in solid lines, to a raised or lifted position shown in dashed lines. FIG. 5 depicts the suspension system in the raised or lifted position with the tire shown in dashed lines no longer in contact with the ground.

In the configuration shown in FIG. 3, air bags 120 are inflated and supporting the load on the suspension system. Air bags 116 are deflated or maintained at a lower pressure so that the control arms 106 and 108 hold the axle in contact with the ground. Referring now to FIG. 4, the air bags 120 are deflated or reduced air pressure is maintained in them to allow them to compress vertically and air bags 116 are inflated or held with increased pressure causing them to expand along their length. The expansion of the air bags 116 forces control arms 106 and 108 to pivot on bracket 110 and change orientation in the direction of the arrow thus lifting axle 100 and the attached hubs, thus raising the tire to the upper position shown in dashed lines no longer in contact with the ground. Referring now to FIG. 5, the inflated air bags 116 have reoriented and reshaped the polygon created by the control arms 106 and 108 and the brackets 110 and 500 to lift axle 100 and the tire shown in dashed lines off the ground.

Referring now to FIG. 5, the depicted embodiment of bracket 206 comprises air bag seat 502 which is attached to upper control arm 106 by at least one rib 504. Similarly, bracket 204 comprises air bag seat 506 attached to lower control arm 108 by at least one rib 508. In some embodiments, the air bag seats and the ribs are formed from a single piece of bent or cast metal and in some embodiments they may be welded to one another. The brackets are welded or otherwise attached to the control arms in the desired configuration.

Figure 6:
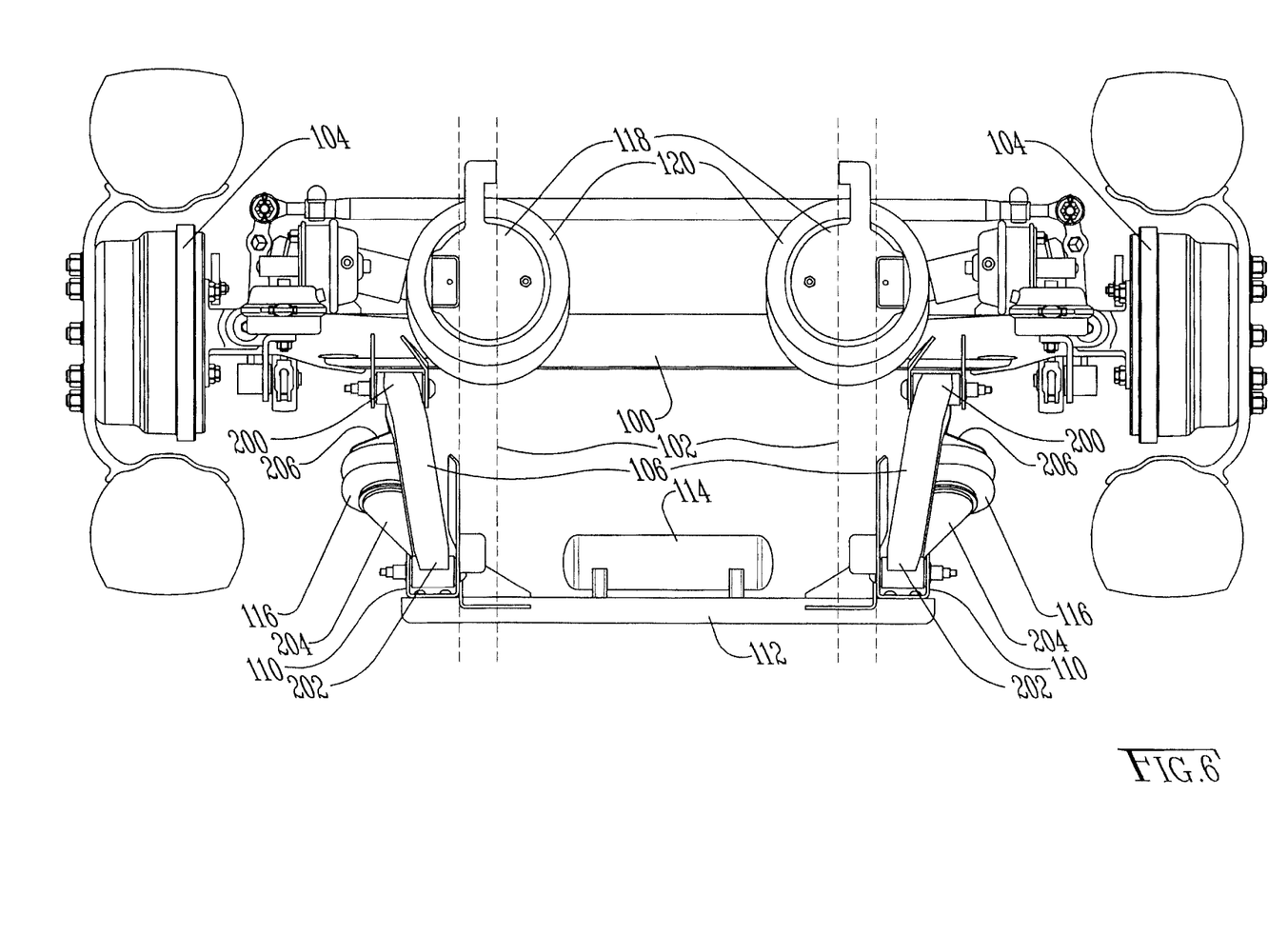
FIG. 6 is a top view a vehicle suspension system incorporating an embodiment of the axle lift system.
Figure 7:
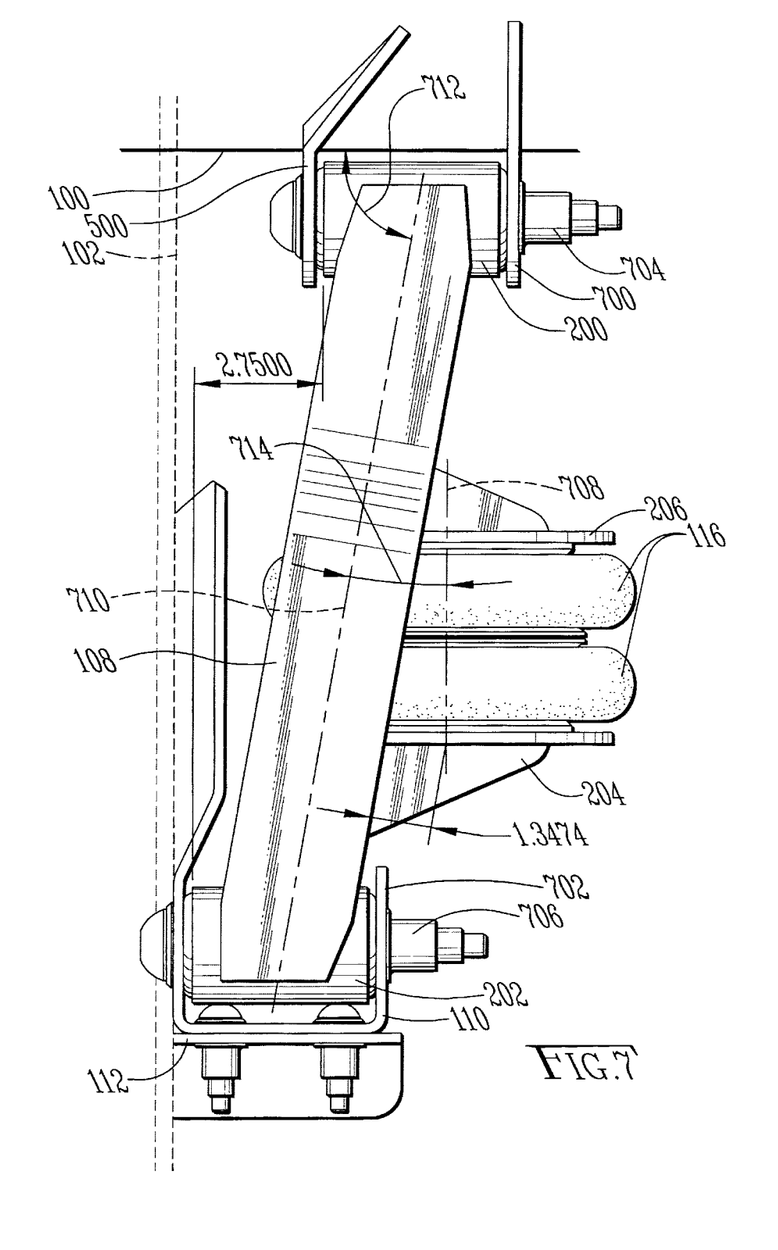
FIG. 7 is a detail top view of a portion of a vehicle suspension system incorporating an embodiment of the axle lift system.

Referring now more specifically to FIGS. 6 and 7, bottom views of an embodiment of the lift suspension system are depicted. As can be seen clearly in this view, control arms 106 and 108 extend from axle 100 and chassis 102 at a non-perpendicular angle. Specifically, in the depicted embodiment, the control arms 106 and 108 extend outwardly from the chassis 102 as the arms 106 and 108 extend from brackets 110 to axle 100. In some embodiments, the offset control arms 106 and 108 provide more lateral stability as compared to control arms that extend perpendicularly to axle 100. The longitudinal axis 310 of the control arms 106 and 108 are disposed at an angle 312 ranging from 45 to 85 degrees as measured from axis of the inboard portion of the axle 100.

The control arms 106 and 108 are provided with lower and upper air bag brackets 204 and 206, respectively to support the lift air bags 116. Brackets 204 and 206 are offset from the center lines of the control arms 106 and 108 to dispose the lift air bags 116 to the outboard or inboard side of the control arms. "Outboard" in this context refers to the relative disposition of items in relation to the centerline of the chassis 102, wherein an item to the "outboard" is farther from the centerline. "Inboard" in this context refers to the relative disposition of items in relation to the centerline of the chassis 102, wherein an item to the "inboard" is closer to the centerline. The outboard or inboard location of the lift air bags 116 allows the control arms 106 and 108 to pivot closer together than other lift air bag configurations, thus providing more travel between the lowered and lift positions of the suspension.

Referring now to FIG. 7, a detailed bottom view of an embodiment of the lift suspension system is depicted. Lift air bag 116 is disposed between bracket 204 attached to lower control arm 108, and bracket 206 attached to upper control arm 106. Bracket 700 and bolt 704 are provided to pivotally attach first end 200 of lower control arm 108 to axle 100. Bracket 702 and bolt 706 are provided to pivotally attach second end 202 of lower control arm 108 to bracket 110. Similar brackets and bolts are provided to pivotally attach the upper control arm 106 to axle 100 and bracket 110.

The center or longitudinal axis 708 of lift air bags 116 is offset from the lengthwise or longitudinal axis of control arms 106 and 108. The axis 708 is also at an angle to the longitudinal, or lengthwise, axis of control arms 106 and 108. In the depicted embodiment, axis 708 is substantially perpendicular to axle 100, though it need not be in other embodiments. Brackets 204 and 206 extend in an outboard direction from control arms 106 and 108, and are angled to hold the air bag 116 on axis 708. In some embodiments, the bracket 700 is offset from bracket 702 by 2.75 inches though this offset may vary in different embodiments. The axis 708 is disposed outboard of the control beams 106 and 108, and is not disposed between the two control arms, although a portion of lift air bag 116 is disposed between the control arms 106 and 108. In some embodiments, the angle 714 between the axis 708 and the longitudinal axis of control arms 106 and 108, and angle 712 are complementary angles.

In an additional embodiment of the lift suspension system, the brackets 204 and 206 are offset from the center lines of the control arms 106 and 108 in the onboard direction disposing the lift air bags 116 to the inboard side of the control arms. In such an embodiment the configuration of the brackets may be reversed so that the brackets 204 are attached to lower control arm 108 and brackets 206 are attached to upper control arm 106.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. An axle lift system for a suspension for a vehicle, the vehicle having a chassis, an axle having a first end and a second end, an upper control arm and a lower control arm pivotally attached at a first end of each control arm to the axle at a point on the axle and pivotally attached a second end of each control arm to the chassis, with the upper control arm substantially above the lower control arm, the axle lift system comprising:
    an upper air bag bracket attached to the upper control arm,
    a lower air bag bracket attached to the lower control arm,
    a lift air bag attached between the upper air bag bracket and the lower air bag bracket,
    wherein the longitudinal axis of the lift air bag is disposed at an angle to the longitudinal axis of the control arms.

2. The axle lift system of claim 1 wherein the control arms are disposed at a first angle to the axle such that the first end of each control arm is offset from the second end thereof with respect to the centerline of the chassis.

3. The axle lift system of claim 2 wherein the upper control arm comprises a first portion and a second portion disposed at an angle to each other along the longitudinal axis of the control arm; and
    the lower control arm comprises a first portion and a second portion disposed at an angle to each other.

4. The axle lift system of claim 3 wherein the upper air bag bracket is attached to the second portion of the upper control arm; and the lower air bag bracket is attached to the first portion of the lower control arm.

5. The axle lift system of claim 4 wherein the upper air bag bracket comprises an air bag seat and at least one rib attaching the air bag seat to the upper control arm, and wherein the lower air bag bracket comprises an air bag seat and at least one rib attaching the air bag seat to the lower control arm.

6. The axle lift system of claim 4 wherein the control arms are disposed such that the first end of each control arm is offset from the second end thereof in an outboard direction with respect to the centerline of the chassis.

7. The axle lift system of claim 4 wherein the control arms are disposed such that the first end of each control arm is offset from the second end thereof in an inboard direction with respect to the centerline of the chassis.

8. The axle lift system of claim 6 wherein the longitudinal axis of the lift air bag is disposed outboard of the control arms.

9. The axle lift system of claim 6 wherein the longitudinal axis of the lift air bag is disposed inboard of the control arms.

10. A suspension system for a vehicle having a chassis, the suspension system comprising:
    an axle;
    an upper control arm and a lower control arm pivotally attached at a first end of each control arm to the axle at a first point on the axle, with the upper control arm substantially above the lower control arm;
    an upper air bag bracket attached to the upper control arm;
    a lower air bag bracket attached to the lower control arm;
    a lift air bag attached between the upper air bag bracket and the lower air bag bracket,
    wherein the second ends of the control arms are pivotally attached to at least one hanger bracket attached to the chassis;
    wherein each of the control arms is disposed at a first angle to the axle such that the first end of each control arm is offset from the second end thereof with respect to the centerline of the chassis;
    wherein the lift air bag is disposed at a second angle to the control arms; and wherein the center axis of the lift air bag is substantially offset from the axis of the control arms.

11. The suspension system of claim 10, wherein the center axis of the lift air bag is disposed outboard of the longitudinal axis of the control arm to which it is attached.

12. The suspension system of claim 10, wherein the center axis of the lift air bag is disposed inboard of the longitudinal axis of the control arm to which it is attached.

13. A method for using the axle lift system of claim 1, comprising the steps of:
   inflating the lift air bag until the upper and lower control arms pivot upwardly sufficiently to raise the axle a desired distance to a lifted position;
   operating the vehicle with the axle in the lifted position;
   deflating the lift air bag until the upper and lower control arms pivot downwardly sufficiently to lower the axle a desired distance to a lowered position;
   operating the vehicle with the axle in the lowered position.

14. The method of claim 13 wherein the lifted position comprises a position wherein a tire mounted on the axle is not in contact with the ground, and the lower position comprises a position wherein a tire mounted on the axle is in contact with the ground.

15. The method of claim 14 wherein the vehicle is provided with a suspension air bag for supporting the axle beneath the chassis, the method further comprising the steps of:
   deflating the suspension air bag before or simultaneously with the step of inflating the lift air bag; and
   inflating the suspension air bag after or simultaneously with the step of deflating the lift air bag.

\* \* \* \* \*